United States Patent [19]

Kiyosawa

[11] 4,270,872
[45] Jun. 2, 1981

[54] STRUCTURAL JOINT

[76] Inventor: Kesaomi Kiyosawa, 2-22-1, Minamiaoyama, Minato-ku, Tokyo, Japan

[21] Appl. No.: 28,729

[22] Filed: Apr. 10, 1979

[30] Foreign Application Priority Data

Jan. 29, 1979 [JP] Japan .................... 54/9007[U]

[51] Int. Cl.³ .............................................. F16B 9/00
[52] U.S. Cl. .................................... 403/170; 403/217; 403/258; 403/260; 403/263
[58] Field of Search ............... 403/169, 170, 171, 172, 403/176, 217, 243, 258, 260, 263, 264, 189, 194, 200

[56] References Cited

U.S. PATENT DOCUMENTS

| 1,973,536 | 9/1934 | Mack | 403/171 X |
|---|---|---|---|
| 2,609,638 | 9/1952 | Lindenmeyer | 403/176 X |
| 2,947,554 | 8/1960 | Koch | 403/169 |
| 3,181,902 | 5/1965 | Aitken | 403/258 |
| 3,485,519 | 12/1969 | Chiu | 403/172 |
| 3,632,147 | 1/1972 | Finger | 403/217 X |
| 3,890,022 | 6/1975 | Moon | 403/171 X |
| 3,901,613 | 8/1975 | Anderson | 403/171 X |
| 3,973,854 | 8/1976 | Gilbo et al. | 403/170 |
| 4,012,153 | 3/1977 | Pidgeon | 403/170 |
| 4,044,497 | 8/1977 | Bettens | 403/170 X |

Primary Examiner—Peter P. Nerbun
Attorney, Agent, or Firm—Fleit & Jacobson

[57] ABSTRACT

This device relates to a structural material or joint comprising the combination of: a connector capable of connecting a rectangular pipe in an arbitrary direction, a spacer possible to insert into a penetrating hole perforated in the connector, a rectangular pipe which can be connected with a joint rod of the connector, and a pipe which is possible to install to the spacer.

Especially, the structural material or joint according to this device relates to those capable of assembling the structures such as wall face in the shop and inside and outside the house, shelf of the ceiling etc., ornamental materials and the skeleton for the wall face and the like briefly and solidly.

5 Claims, 7 Drawing Figures

STRUCTURAL JOINT

BACKGROUND OF THE INVENTION

Heretofore, there has been various kinds of devices for assembling method of structures connecting pipes in an arbitrary direction using a connector.

Those methods, however, have such defects as capable of using only one kind of pipe and further incapable of assembling the structures in an arbitrary solid direction.

This device relates to a completely novel technique developed in consideration of those conventional defects.

DETAILED DESCRIPTION OF THE DRAWINGS

Figure 1:
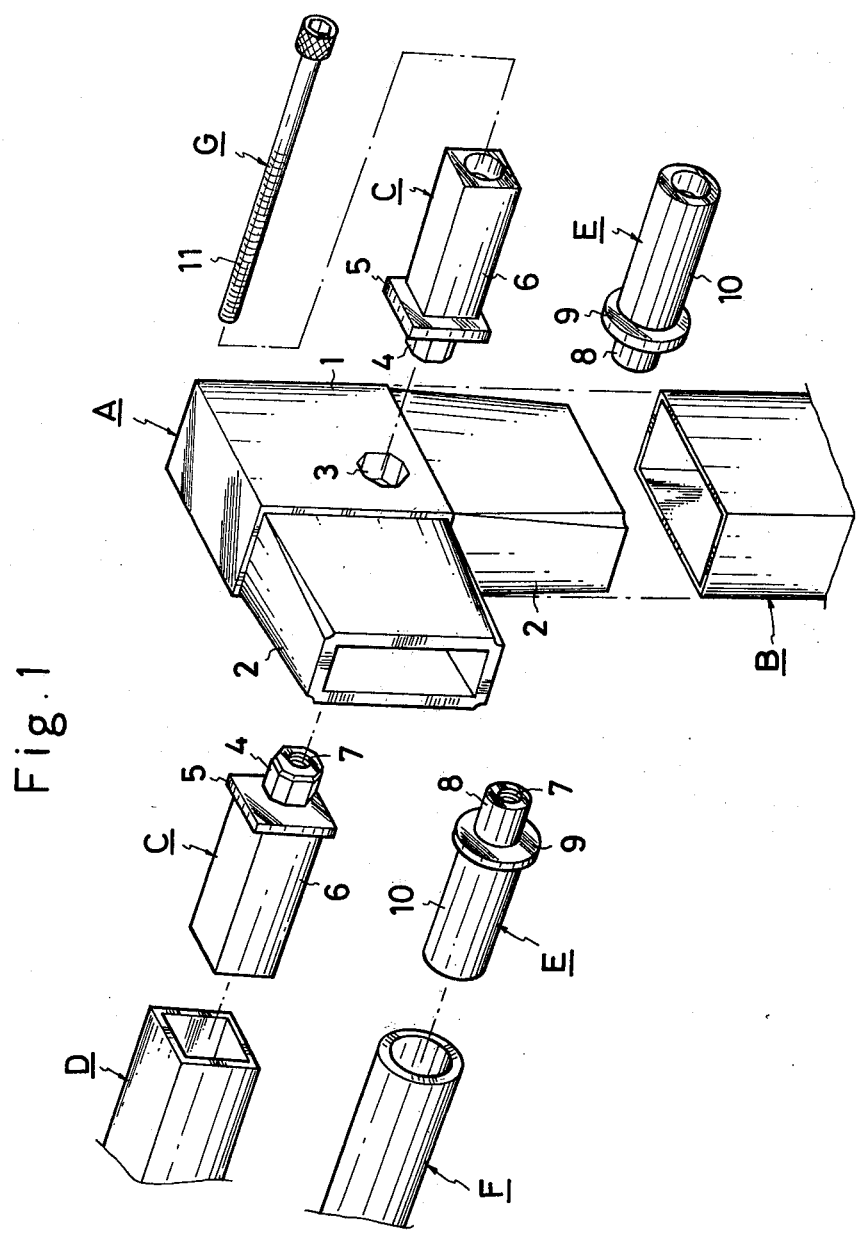
FIG. 1 is a perspective view which shows parts formed by the structural materials of this application.

Referring to the example of this device in the drawings concretely, A in FIG. 1 is a connector which has a plurality of protruding joint rods 2 at the sides of the base stand 1. Said joint rod is constructed to be slightly larger outer diameter than the inner diameter of said rectangular pipe B to be connected with, and the sides of said base stand 1 are constructed to have approximately equal outer diameters to those of pipe B. Further the penetrating hole 3 is perforated in front and rear directions at a fixed position of said base stand 1.

Then, C is a spacer for square pipe comprising: a leg 4 capable of inserting into said penetrating hole 3, a square flange 5 having an equal diameter with an outer diameter of a square pipe D connected hereto, and a skirt part 6 having an equal or a slightly larger diameter than the inner diameter of said square pipe D; and the inner wall surface of said leg 4 is perforated with a screw hole 7.

Further E is a spacer for a round pipe comprising: a leg 8 having a screw hole 7, a round flange 9, and a skirt part 10 having an equal to, or a slightly larger diameter than an inner diameter of a round pipe F.

Further, G is a fixed bolt which can be fixed said C and E to the connector A respectively and composed of protruding a screw rod 11 capable of inserting into said penetrating hole 3 and of screwing on said screw hole 7.

Figure 2:
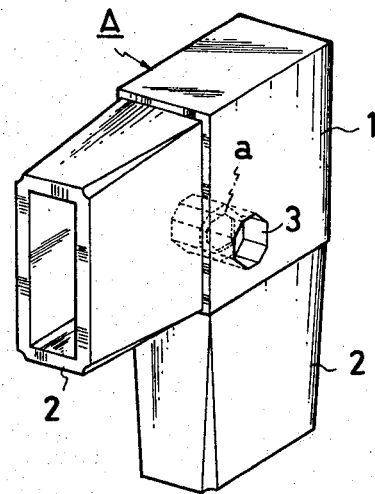
FIG. 2 is a perspective view of the connector.
Figure 3:
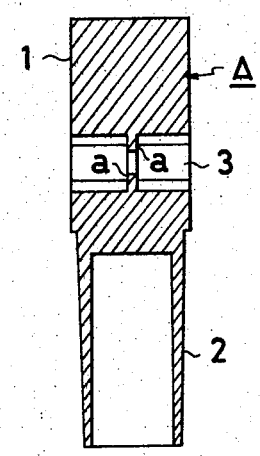
FIG. 3 is a longitudinal sectional view of the connector in FIG. 2.
Figure 4:
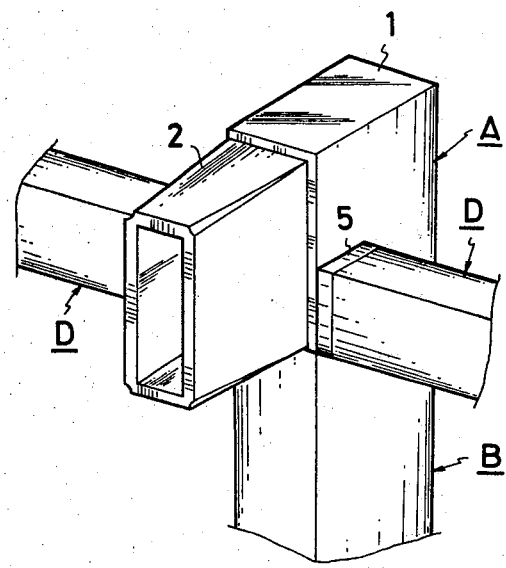
FIG. 4 is a perspective view of the embodiment of the assembly.
Figure 5:
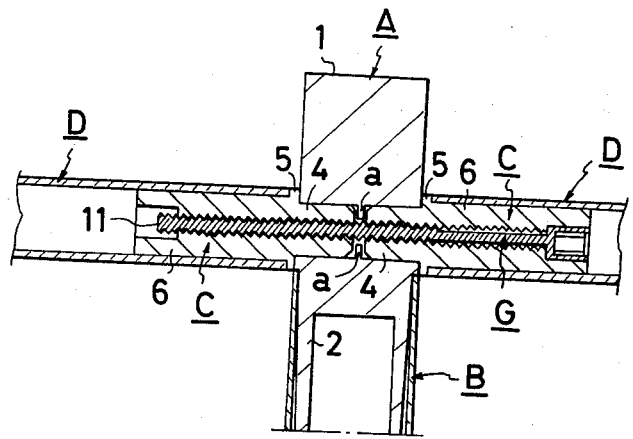
FIG. 5 is a longitudinal sectional view in FIG. 4.
Figure 6:
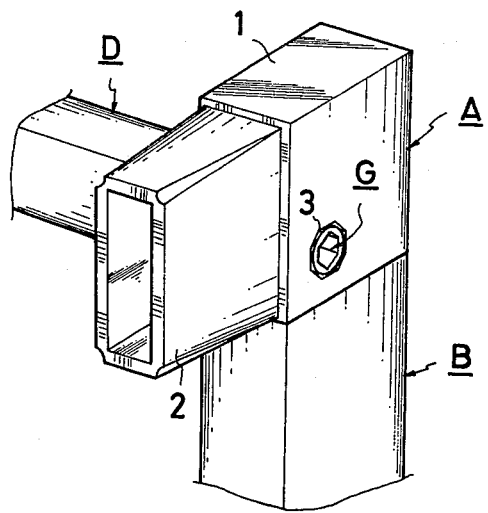
FIG. 6 is a view in perspective of another embodiment of assembly.
Figure 7:
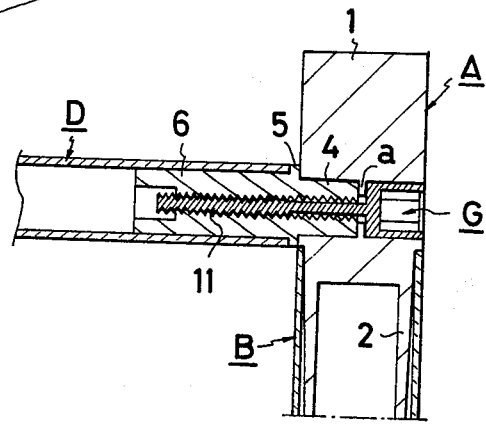
FIG. 7 is a longitudinal sectional view of FIG. 6.

At the middle portion of said penetrating hole 3 in said base stand 1 of this device in said example, a convex ring a is installed as shown in FIG. 2 and FIG. 3, whereby in case of installing a spacer at only one side of a base stand 1, the head of the fixed bolt G inserted from the opposite side thereof is allowed to stop and its head parts are embedded in the penetrated hole 3 completely.

In employing the assembly of the structural materials according to this device, the square pipe D can be connected with said connector A by: connecting the rectangular pipe B with joint rod 2 protruded in an arbitrary direction of connector A, fixing the leg 4 of the spacer C with a fixing bolt G together with inserting said leg 4 into the penetrating hole 3 of the connector A, and further inserting the square pipe D into the skirt portion 6 of the spacer C.

In said example, the case in which the square pipe D is connected with the connector A is illustrated, but the case wherein the round pipe F is connected with, is also capable of installing as same as said example by employing the spacer E.

The structural materials according to this device has a joint rod at an arbitrary side and comprises the connector having the penetrating hole perforated in the front and rear direction, the spacer for installing the pipe capable of fixing with fixing bolts, etc. by inserting said spacer into said penetrating hole, and the combination of two kinds of pipes capable of connecting with the joint rod and the spacer respectively. It is possible to assembly the various kinds of structures such as wall faces, and ceilings, etc. in shops, and in- and out-door houses briefly and solidly by combining them in accordance with the request. Further, the convex ring is installed at the middle part of said penetrating hole, whereby when the pipe is installed only for one side, the head of the bolt inserted from the opposite side of said pipe is allowed to stop by said convex ring. Accordingly, the head of the bolt can be completely embedded in the penetrating hole. Thus, this device has such feature as a good appearance, etc. without generating any obstacle caused by the protrusion of pinch and nut in the conventional joint rod.

I claim:

1. A structural joint formed of a plurality of selectively interconnected components, said components including:
    a connector (A) comprising a base portion (1) and a joint rod (2) protruding from the base portion, the base portion having an opening (3) passing therethrough;
    a pipe (B) having a portion thereof engageable with said joint rod to thereby connect the pipe with said connector;
    a first spacer (C) for interconnecting a rectangular pipe (D) to said connector, said spacer having an internally threaded leg (4) insertable into said opening, a flange (5) abutting with said connector upon insertion of said leg into said opening, and a skirt part (6) projecting away from said connector upon insertion of said leg into said opening;
    a rectangular pipe (D) having a portion thereof engageable with said skirt part to thereby connect said rectangular pipe to said connector;
    a second spacer (E) for interconnecting a round pipe (F) to said connector, said second spacer having an internally threaded leg (8) insertable into said opening, a flange (9) abutting with said connector upon insertion of said leg of said second spacer into said opening, and a skirt part (10) projecting away from said connector upon insertion of said leg of said second spacer into said opening;
    a round pipe (F) having a portion thereof engageable with said skirt part of said second spacer to thereby connect said round pipe to said connector; and
    a bolt (G) insertable through said opening and having a threaded portion (11) engageable with the internally threaded portion of the leg of one of said first and said second spacers to thereby secure the engaged spacer to said connector.

2. A structural joint according to claim 1, further comprising a convex ring (a) inserted into said opening, said ring forming an abutment surface, said bolt having a head positionable in contact with said abutment surface.

3. An assembly of components for forming a composite structure by selectively interconnecting rectangular and round pipes, the components including:

a connector (A) comprising a base portion (1) and a joint rod (2) protruding from the base portion, the base portion having an opening (3) passing therethrough, the joint rod being engageable by a portion of a pipe to connect the pipe with said connector;

a first spacer (C) for interconnecting a rectangular pipe (D) to said connector, said spacer having an internally threaded leg (4) insertable into said opening, a flange (5) abutting with said connector upon insertion of said leg into said opening, and a skirt part (6) projecting away from said connector upon insertion of said leg into said opening, the skirt part being engageable by a portion of a rectangular pipe to connect the pipe with said connector;

a second spacer (E) for interconnecting a round pipe (F) to said connector, said second spacer having an internally threaded leg (8) insertable into said opening, a flange (9) abutting with said connector upon insertion of said leg of said second spacer into said opening, and a skirt part (10) projecting away from said connector upon insertion of said leg of said second spacer into said opening, the skirt part of said second spacer being engageable by a portion of a round pipe to connect the round pipe with said connector; and a bolt (G) insertable through said opening and having a threaded portion (11) engageable with the internally threaded portion of the leg of one of said first and said second spacers to thereby secure the engaged spacer to said connector.

4. An assembly of components according to claim 3, further comprising a convex ring (a) inserted into said opening, said ring forming an abutment surface, said bolt having a head positionable in contact with said abutment surface.

5. An assembly of components according to claim 3, wherein the skirt part of each of said spacers has an axially extending passageway formed therein having a size greater than the diameter of the threaded portion of the legs of said spacers, said bolt having an enlarged head and being insertable through the passageway of one spacer so that the head contacts a portion of the leg of one spacer with the threaded portion of the bolt extending through the opening in said connector and engaging the threaded portion of the leg of another spacer to thereby connect two spacers to said connector.

* * * * *